N. W. FINCH.
COMBINED CUSHION AND PNEUMATIC TIRE.
APPLICATION FILED SEPT. 2, 1921.
1,427,897.  Patented Sept. 5, 1922.
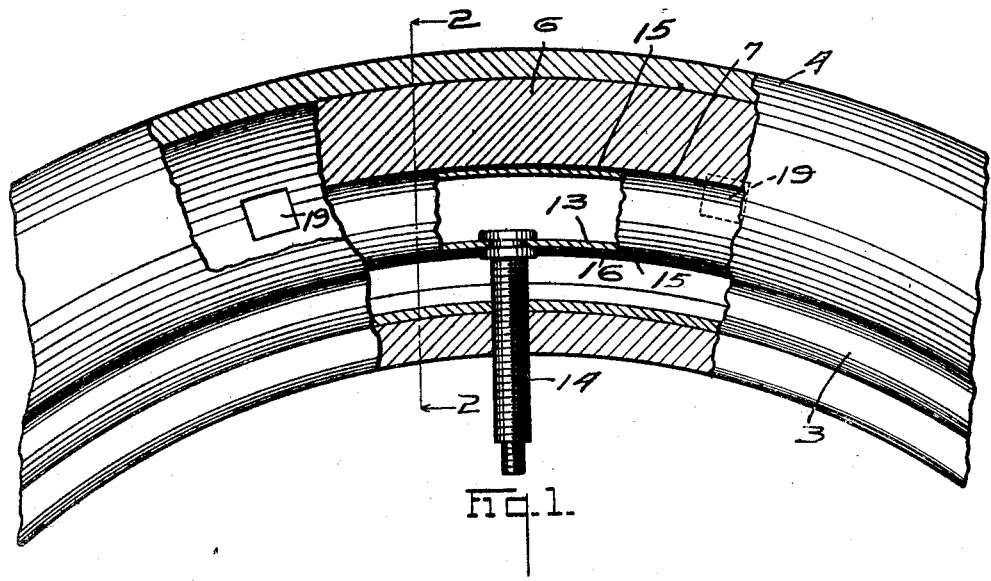
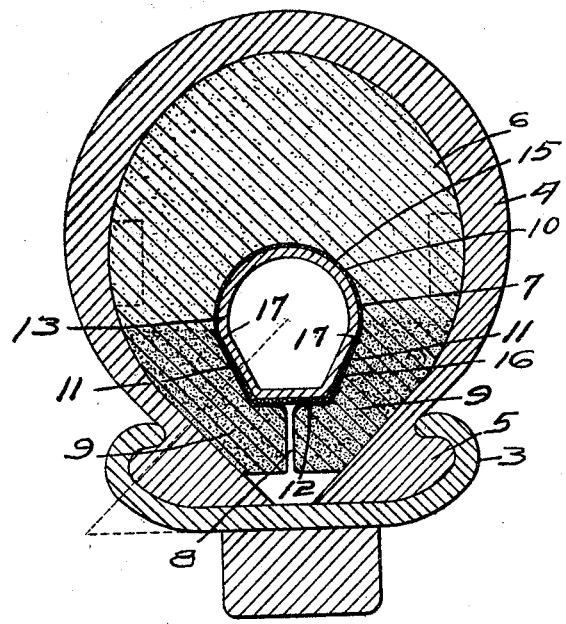
INVENTOR
Nelson W. Finch,
by
Owen, Owen & Crampton.

Patented Sept. 5, 1922.

1,427,897

UNITED STATES PATENT OFFICE.

NELSON W. FINCH, OF CHICAGO, ILLINOIS.

COMBINED CUSHION AND PNEUMATIC TIRE.

Application filed September 2, 1921. Serial No. 497,954.

*To all whom it may concern:*

Be it known that I, NELSON W. FINCH, a citizen of the United States, and a resident of Chicago, in the county of Cook and State of Illinois, have made an invention appertaining to Combined Cushion and Pneumatic Tires; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide in combination with a filler for tire casings having a pneumatic expanding tube, a means whereby the tube may be located in a position that will produce the maximum clinch as between the casing in which the filler and tube is placed and the rim of the wheel and yet pinching or rupture of the tube will be avoided. The invention also has for its object to provide means for preventing the creeping of the filler relative to the casing.

Constructions containing the invention may partake of different forms and yet such structures may still be within the scope of the combinations of elements set forth in the claims appended hereto. To illustrate a practical application of the invention I have selected a structure containing the invention as an example of such structures and shall describe it hereinafter. The structure selected is illustrated in the accompanying drawings.

Figure 1 of the drawings is a broken side view showing a longitudinal section, a side view of a part of the tire and a side view of a part of the filler. Fig. 2 is a sectional view taken substantially along the line 2—2 illustrated in Fig. 1.

In the drawings, 3 is the rim to which is secured the casing 4, the casing 4 being provided with a bead 5 located within the returned edges of the rim 3, it being understood, however, that the invention may be used in connection with flat sided casings.

A filler 6 is located within the casing 4. It has a substantially oval cross section, it being provided with flat sides in order to sustain the tread of the casing and to enable the load to be sustained through the filler between the tread portion and the rim directly through the filler. It has a small tubular channel 7 that is connected with the inner circular side or central line extending along the inner side, by a cut 8 which forms two inwardly extending lips 9. The tubular channel in its outer part 10 is circular in form or more accurately speaking is semi-toric. The side portions of the tubular channel, as at 11, are flat. They extend from the circular portion 10 of the tubular channel to the inner side 12 of the tubular channel which is also flat. When the elastic tube 13 is inserted in position between the lips 9 and expanded by air which may be inserted through the valve stem 14, it produces a pressure directly against the flat surfaces of the lips 9 which is substantially towards the inturned edges of the rim 3 and thus crowds the casing against the inturned edges which enables the beads 5 to securely hold the casing. The center of the cross section of the channel 7 is located in a line that passes through the center of one or the other of the sections of the beads and is 45° to a line extending across the bottom of the rim. In this way the channel is somewhat raised from the rim and the lips 9 have considerable thickness and rigidity. The end edges of the lips extend beneath the tubular channels 7 and sustain the pneumatic pressure produced in the tube 13 along the side 12 of the channel, notwithstanding the pressure that causes the edges of the lips to slightly separate.

The interior of the channel is double lined by a very light weight fine mesh net indicated, conventionally, at 15. The net is cut on the bias at an angle of 38° to 60° to allow it to conform to the tubular form of the chamber, and the short fibres are located at 90° to each other. The sides of the two-ply net overlap and cover the cut or slot 8. The net prevents sticking or chafing and moreover affords a means for causing frictional engagement with the flap 16, and also permits conformation with the interior of the chamber. A flap of heavy duck or cord fabric has one edge 17 that is located practically at the point of juncture between one of the planular side portions 11 and the circular portion 10 of the channel 7 and is secured between the layers of the net. Its opposite edge may extend to a point of juncture between the other planular side portion 11 with the circular portion 10 of the channel 7. It is secured to one side of the channel and consequently adheres to one of the lips 9. The other side or half of the flap is insertable between the tube 13 and the other lip 9. The planular sides of the channel 7, when the flap has once been inserted into position and the tube 13 expanded, will securely hold the flap and prevent the tube 13 from slipping in between the lips 9 by reason of the planular surfaces of the sides of the channels 7 and by reason of the corners formed between the planular sides.

The filler 6 is formed of two stocks of rubber. A heavy rubber stock is used to about the depth of the center of the tube 13 as measured from the rim which makes the lips 9, comparatively, quite rigid while the outer portions of the filler contains a lighter rubber stock and is consequently more resilient which allows expansion of the outer portion of the filler and consequently allows expansion of the cylindrical portion of the surface of the channel but causes the remainder of the channel to retain its form. This construction also produces, comparatively speaking, more rigid lips for sustainment of the tube and for compression of the sides of the casing to hold the beads in clinching relation with the rim.

The filler 6 may be provided with recesses 19 that form pockets. The pockets will operate as a vacuum to increase the adherence between the filler and the casing.

I claim:—

In an automobile tire, a casing, a filler located in the casing, the filler having a tubular chamber located in proximity to the rim side of the filler, the filler being slitted between the one side of the filler and the tubular chamber to form lips extending around the sides of the tubular chamber and between the tubular chamber and the rim side of the filler, the tubular chamber having three planular sides, two of the sides located between the inturned edges of the rim and tubular chamber, the front side located between the said two sides, a flap extending over the said three sides, a light weight net of fine mesh located on the surface of the tubular chamber, and an elastic tubular member located within the tubular chamber and having a means for retaining air under pressure within the tubular member, the filler formed of a heavy and a lighter rubber composition, the heavy composition being located within the lips to increase their rigidity, and the lighter composition located in the outer portion of the filler to permit expansion of the circular portion of the chamber.

In testimony whereof I have hereunto signed my name to this specification.

NELSON W. FINCH.